United States Patent
Bruckman

(10) Patent No.: US 7,113,485 B2
(45) Date of Patent: Sep. 26, 2006

(54) LATENCY EVALUATION IN A RING NETWORK

(75) Inventor: Leon Bruckman, Petah Tiqva (IL)

(73) Assignee: Corrigent Systems Ltd., Tel Aviv (IL)

( * ) Notice: Subject to any disclaimer, the term of this patent is extended or adjusted under 35 U.S.C. 154(b) by 1038 days.

(21) Appl. No.: 09/947,183

(22) Filed: Sep. 4, 2001

(65) Prior Publication Data

US 2003/0048754 A1    Mar. 13, 2003

(51) Int. Cl.
    *G01R 31/08*    (2006.01)
(52) U.S. Cl. .................................. 370/252; 370/516
(58) Field of Classification Search ................ 370/252, 370/403, 406, 222
    See application file for complete search history.

(56) References Cited

U.S. PATENT DOCUMENTS

| | | | | |
|---|---|---|---|---|
| 5,235,593 | A |   | 8/1993 | Grow et al. ................ 370/85.5 |
| 5,878,032 | A | * | 3/1999 | Mirek et al. ................. 370/252 |
| 6,058,102 | A | * | 5/2000 | Drysdale et al. ............ 370/252 |
| 6,438,603 | B1 | * | 8/2002 | Ogus ........................... 709/233 |
| 6,868,094 | B1 | * | 3/2005 | Bordonaro et al. ......... 370/516 |

OTHER PUBLICATIONS

H. Schulzrinne, RTP: A Transport Protocol for Real-Time Applications, Jan. 1996, IETF, RFC 1889.*
Harrera et al., "A Framework for IP over Packet Transport Rings", Internet Draft, draft-ietf-ipoptr-framework-00, Jun. 2001.
D. Tsiang et al., Request for Comments (RFC) 2892 of the Internet Engineering Task Force (IETF), Aug. 2000.

* cited by examiner

*Primary Examiner*—Brian Nguyen
(74) *Attorney, Agent, or Firm*—Darby & Darby

(57) ABSTRACT

A method for measuring latency in a bi-directional ring network includes transmitting a latency measurement packet from an originating node to a peer node and noting a time of receipt of the packet at the peer node. The packet is then transmitted back to the originating node in the opposite direction, while recording in the packet an indication of a peer node difference between a time of transmission of the packet from the peer node to the originating node and the time of receipt of the packet at the peer node. A time of return of the packet to the originating node is noted, so as to determine an originating node difference between a time of transmission of the packet from the originating node to the peer node and the time of return of the packet to the originating node. The latency is calculated by taking a difference between the originating node difference and the peer node difference.

20 Claims, 2 Drawing Sheets

LATENCY EVALUATION IN A RING NETWORK

FIELD OF THE INVENTION

The present invention relates generally to network communication systems and protocols, and specifically to methods of latency measurement in packet-switched networks, and particularly in ring networks.

BACKGROUND OF THE INVENTION

Network ring topologies are gaining in popularity, particularly in Internet Protocol (IP) networks. Such networks enable carriers to offer large bandwidth to users in a cost-effective manner, since each node in the network needs only two interfaces, rather than having to maintain a separate interface for each of the other nodes as in a mesh network.

Recently-developed bidirectional protocols provide efficient bandwidth utilization by enabling data to be transferred between any pair of nodes in either direction around the ring, while maintaining fast protection against faults. The two opposing traffic directions are commonly referred to as an inner ring and an outer ring. It will be understood, however, that in the context of the present patent application and in the claims, the terms "inner" and "outer," as well as "clockwise" and "counterclockwise," are used arbitrarily to distinguish between the two opposing directions of packet flow in a ring network. These terms are chosen solely for convenience of explanation, and do not necessarily bear any relation to the physical characteristics of the network.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents are incorporated herein by reference. They are available at www.ietf.org.

Using protocols such as these, each node in a ring network can communicate directly with all other nodes through either the inner or the outer ring, using the appropriate Media Access Control (MAC) addresses of the nodes. Each packet sent over one of the rings carries a header indicating its destination node. The destination node recognizes its address in the header and strips the packet from the ring. All other nodes pass the packet onward transparently around the ring.

It is common in all sorts of data communication networks for network users to enter into a service level agreement (SLA) with their network service providers. The SLA specifies the quality of service (QoS) that the user is entitled to receive, based on a list of service parameters, such as network availability, percent of packets lost, mean latency of packet delivery, and deviation of the latency relative to the mean. Controlling latency is important particularly for real-time services, such as voice and video. In order to commit to a SLA that includes latency-related parameters, the service provider must be able to monitor the latency so as to verify compliance with the SLA.

Methods of network latency measurement are known in the art. For example, U.S. Pat. No. 5,235,593, to Grow et al., describes a ring latency timer for the purpose of latency measurement in token rings. A token ring is a closed, unidirectional ring network. A small token frame circulates around the ring. A node wishing to transmit on the ring captures the token and is then granted control of the transmission medium for a specified period. After capturing the token, the node transmits an information frame on the ring. When one of the nodes recognizes the destination address of the frame as its own, it copies the frame. After completing the transmission, the sending node releases the token for use by the other nodes.

In order to measure the ring latency, the node sends a special "void" frame before releasing the token. The void frame contains the address of the sending node in both the sender and destination fields. A latency counter is initialized when the void frame is released, and it is incremented every 16 clock cycles until the void frame is received back at the sending node. A latency bit is then set, and the value of the counter indicates the latency of the ring. The value remains valid until the latency bit is reset, whereupon the measurement is repeated.

The measured latency value gives an indication of the traffic load on the ring. The measured value is compared to a target token rotation time (TRTT) in order to determine whether and when each of the nodes in the ring is entitled to transmit data. Different TRTT values can be set for different classes of service on the ring, in order to allocate ring bandwidth preferentially to high-priority services. All of these TRTT values are compared against the same measured latency value to determine when the different services are allowed to transmit frames on the ring.

The methods described by Grow et al. can be used for measuring latency of transmission around the entire ring in a single direction, but they do not provide a means for measuring round-trip, node-to-node latency between a pair of nodes on the ring. Most methods known in the art for measuring such round-trip latency are based on measuring the time required for a packet to be sent from a source node to a destination node and then back again. These methods suffer from the drawback that the measured latency includes the time taken by the destination node to process the packet that it receives from the source node and to generate the response packet to send back to the source node.

Alternatively, it is possible to measure one-way latency from the source node to the destination node, and thus to eliminate the effect of the processing time at the destination node. Such a measurement, however, requires precise synchronization between the clocks at the source and destination nodes. Most networks do not maintain sufficiently accurate synchronization between nodes to enable meaningful measurements of one-way latency to be made. Therefore, costly hardware must typically be added to the network to enable accurate one-way latency measurements.

SUMMARY OF THE INVENTION

It is an object of the present invention to provide improved methods and devices for measuring network latency, particularly in ring topologies.

It is a further object of some aspects of the present invention to provide methods for measuring respective latencies of different classes of service.

It is yet a further object of some aspects of the present invention to provide simple, accurate methods for measuring round-trip latency between pairs of nodes in a network.

It is still a further object of some aspects of the present invention to provide methods for monitoring latency variations over time.

Preferred embodiments of the present invention provide a novel protocol for making network latency measurements. The protocol is geared particularly to the needs of bidirectional ring networks, but it may also be applied, mutatis mutandis, to other network topologies. The protocol defines a latency measurement packet (LMP), which can be used by an originating node to measure latency both for round-trip transmission, to and from any peer node, and for a full circuit of the ring. When the originating node sends a LMP, it records in the packet the time of transmission and, preferably, a serial number (SN), as well. The recorded transmission times and the SN enable the originating node to identify each LMP upon its return and to determine the latency of transmission based solely on the information contained in the packet.

By sending multiple packets in sequence, the originating node can make multiple latency measurements without confusion, even at overlapping times. It is thus possible to make frequent latency measurements with high precision, so as to monitor variations in the latency over time. Preferably, the LMP also contains an indication of a class of service (CoS). The nodes on the ring transmit the LMP at the priority of the indicated COS level, so that the resultant latency measurement is specific to the CoS. In this way, latency can be measured individually for each of a plurality of CoS levels available on the network.

For round-trip measurement on a bidirectional ring network, the originating node sends a LMP to a peer node via one of the rings, say the inner ring. The peer node records in the packet the time at which it received the packet, using its own clock, which is not necessarily synchronized with the originating node clock. The peer node then prepares to return the packet to the originating node on the outer ring. Upon sending the packet, the peer node records its own time of transmission in the packet (again, using its own clock). When the originating node finally receives the packet in return, it can determine the packet turnaround time at the peer node accurately, simply by taking the difference between the time of receipt and the time of transmission recorded by the peer node. Alternatively, the peer node may provide another indication of the turnaround time, for example, by starting a timer when it receives the packet, and recording the timer value in the packet when it transmits the packet.

In either case, the originating node determines the total round-trip time of the packet (including turnaround time) by taking the difference between its own recorded times of transmission and receipt. It then subtracts out the measured turnaround time to find the net round-trip latency. The resulting latency measurement is highly accurate, irrespective of the turnaround time and with no need for synchronization of the originating and peer node clocks.

There is therefore provided, in accordance with a preferred embodiment of the present invention, a method for measuring latency in a ring network in which traffic flows in first and second, mutually-opposite directions, the method including:

transmitting a latency measurement packet from an originating node to a peer node in the first direction in the network;

noting a time of receipt of the packet at the peer node;

transmitting the packet from the peer node back to the originating node in the second direction, while recording in the packet an indication of a peer node difference between a time of transmission of the packet from the peer node to the originating node and the time of receipt of the packet at the peer node;

noting a time of return of the packet to the originating node, so as to determine an originating node difference between a time of transmission of the packet from the originating node to the peer node and the time of return of the packet to the originating node; and calculating the latency by taking a difference between the originating node difference and the peer node difference.

Preferably, recording the indication of the peer node difference includes recording in the packet the time of transmission of the packet from the peer node to the originating node and the time of receipt of the packet at the peer node, both measured with respect to a peer clock maintained at the peer node. Further preferably, the method includes recording in the packet the time of transmission of the packet from the originating node to the peer node measured with respect to an originating clock maintained at the originating node, and noting the time of return of the packet includes recording the time of return with respect to the originating clock.

There is also provided, in accordance with a preferred embodiment of the present invention, a method for measuring latency in a network in which traffic is transmitted in a plurality of classes of service, the method including:

generating a latency measurement packet containing an indication that the packet belongs to a selected one of the classes of service;

transmitting the latency measurement packet from a source node in the network, so that the packet is passed through the network at a level of service accorded to the class;

noting a time of receipt of the latency measurement packet at a destination node in the network; and calculating the latency for the selected one of the classes of service by taking a difference between a time of transmission of the latency measurement packet and the time of receipt thereof.

Preferably, generating the latency measurement packet includes generating a plurality of latency measurement packets, containing respective indications that the packets belong respectively to the plurality of the classes of services, and wherein calculating the latency includes determining the latency for each of the classes of service respectively.

In a preferred embodiment, the network includes a ring network, and transmitting the latency measurement packet includes transmitting the packet around the ring network so that the destination node of the latency measurement packet is the source node, and calculating the latency includes determining the latency for the selected one of the classes of service for a full circuit of the ring network.

There is additionally provided, in accordance with a preferred embodiment of the present invention, a method for measuring latency in a network, including:

transmitting a sequence of latency measurement packets at given intervals from a source node in the network, while recording in the packets respective times of transmission thereof;

noting respective times of receipt of the packets at a destination node in the network;

determining respective latencies for the packets in the sequence by calculating differences between the respective times of transmission recorded in the packets and the respective times of receipt; and monitoring a variation in the latencies over the sequence based on the calculated differences.

Preferably, transmitting the sequence of the latency measurement packets includes recording respective serial numbers in the packets in the sequence, and monitoring the variation in the latencies includes disregarding the respective latencies of any of the packets that are received out of the sequence, as indicated by the serial numbers.

In a preferred embodiment, the network includes a ring network, and transmitting the sequence of the latency measurement packets includes transmitting the packets around the ring network so that the destination node of the latency measurement packets is the source node, and determining the respective latencies includes determining the latencies for a full circuit of the ring network.

There is further provided, in accordance with a preferred embodiment of the present invention, apparatus for measuring latency in a ring network in which traffic flows in first and second, mutually-opposite directions, the apparatus including first and second nodes in the network, the nodes including respective first and second clocks, wherein the first node is adapted to transmit a latency measurement packet to the second node in the first direction in the network, and wherein the second node is adapted to note a time of receipt of the packet at the second node using the second clock, and to transmit the packet back to the first node in the second direction, while recording in the packet an indication, determined using the second clock, of a second node difference between a time of transmission of the packet from the second node to the first node and the time of receipt of the packet at the second node, and wherein the first node is further adapted to note a time of return of the packet to the first node, using the first clock, so as to determine a first node difference between a time of transmission of the packet from the first node to the second node and the time of return of the packet to the first node, and to calculate the latency by taking a difference between the first node difference and the second node difference.

There is moreover provided, in accordance with a preferred embodiment of the present invention, apparatus for measuring latency in a network in which traffic is transmitted in a plurality of classes of service, the apparatus including a node in the network, which is adapted to generate a latency measurement packet containing an indication that the packet belongs to a selected one of the classes of service and to transmit the latency measurement packet, so that the packet is passed through the network at a level of service accorded to the class, the node being further adapted to note a time of receipt of the latency measurement packet at a destination in the network and to calculate the latency for the selected one of the classes of service by taking a difference between a time of transmission of the latency measurement packet and the time of receipt thereof.

There is furthermore provided, in accordance with a preferred embodiment of the present invention, apparatus for measuring latency in a network, including a node in the network, which is adapted to transmit a sequence of latency measurement packets through the network at given intervals while recording in the packets respective times of transmission thereof, to note respective times of receipt of the packets at a destination in the network, and to determine respective latencies for the packets in the sequence by calculating differences between the respective times of transmission recorded in the packets and the respective times of receipt, so as to monitor a variation in the latencies over the sequence based on the calculated differences.

The present invention will be more fully understood from the following detailed description of the preferred embodiments thereof, taken together with the drawings in which:

DETAILED DESCRIPTION OF PREFERRED EMBODIMENTS

Figure 1:
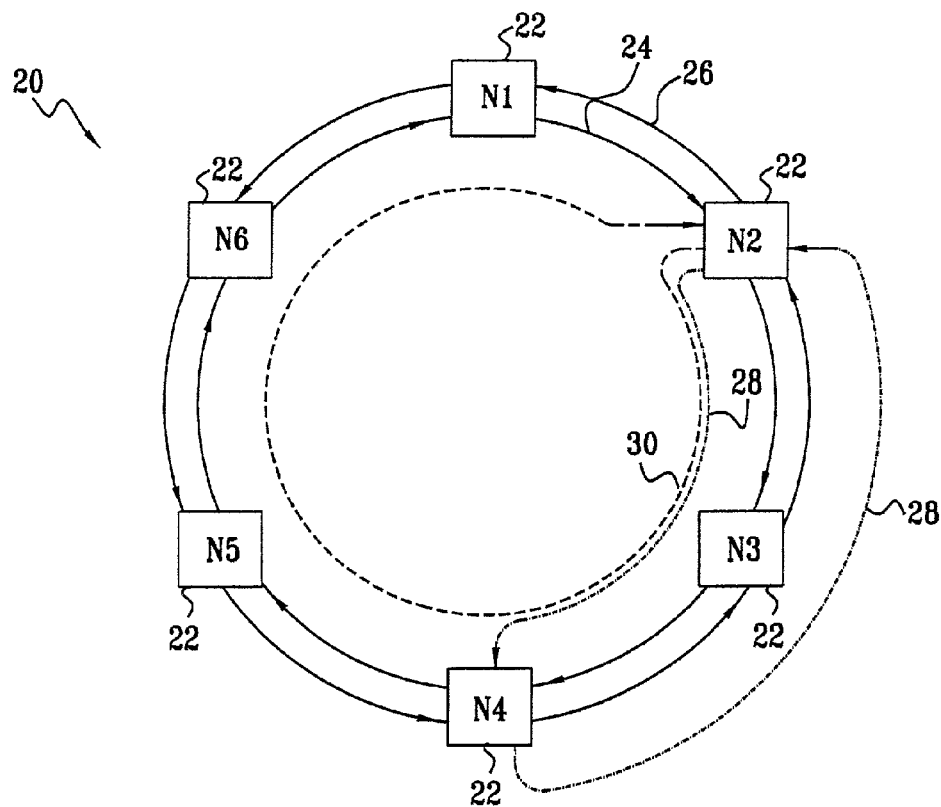
FIG. 1 is a block diagram that schematically illustrates transmission of latency measurement packets in a ring network, in accordance with a preferred embodiment of the present invention.

FIG. 1 is a block diagram that schematically shows a packet ring network 20, in accordance with a preferred embodiment of the present invention. Network 20 comprises nodes 22, marked N1 through N6, which are mutually connected by bidirectional communication media, such as optical fibers or conductive wires. The nodes typically comprise switching equipment, and serve as either access points or gateways to other networks (aggregation points). The communication media in network 22 are configured to define an inner ring 24, over which packets are conveyed between the nodes in a clockwise direction, and an outer ring 26, over which the packets are conveyed in a counterclockwise direction. As noted above, however, the designations of "inner," "outer," "clockwise" and "counterclockwise" are arbitrary and are used here simply for convenience and clarity of explanation. Furthermore, the designation and number of nodes in network 20 are chosen here by way of example, and the network may, by the same token, comprise a greater or smaller number of nodes.

Two types of latency measurements can be conducted in network 20: round-trip and full-circuit. For a round-trip measurement, exemplified by a round-trip path 28, an originating node (N2) sends a latency measurement packet (LMP) to a peer node (N4) on one of the rings, in this case inner ring 24. The peer node processes the LMP and returns it to the originating node on outer ring 26. For a full-circuit measurement, exemplified by full-circuit path 30, the originating node sends a LMP in which it designates itself as both the source and destination address. In either case, the LMP carries information, as described in detail hereinbelow, that enables the latency to be calculated after the packet has returned to the originating node.

Figure 2:
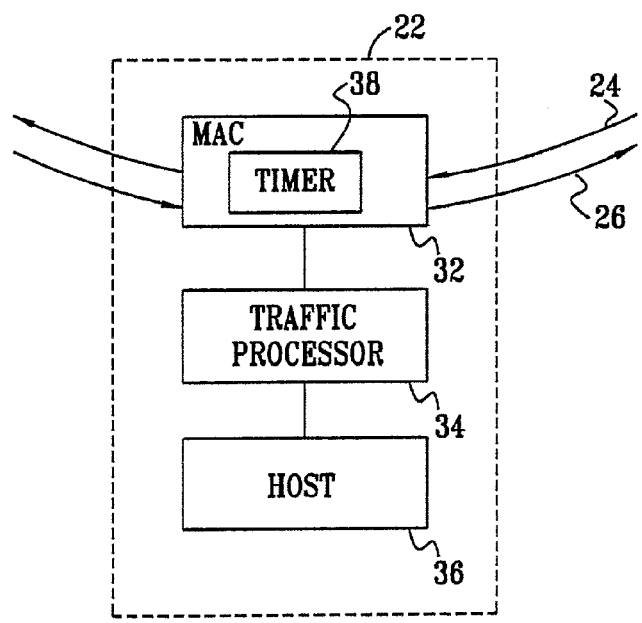
FIG. 2 is a block diagram showing a detail of a node in the network of FIG. 1, in accordance with a preferred embodiment of the present invention.

FIG. 2 is a block diagram that schematically shows details of one of nodes 22 in network 20, in accordance with a preferred embodiment of the present invention. Node 22 comprises a media access control (MAC) block 32, connected to transmit and receive data over both of rings 24 and 26. Preferably, block 32 operates in accordance with the RPR protocol described in the Background of the Invention, or with another, similar bidirectional protocol. Block 32 is responsible for ring management and performs the MAC-layer functions of capturing packets that are addressed to node 22 on either ring, while passing other traffic through transparently to the next node along the ring. When block 32 receives a packet with its own node address as the source address, it also strips the packet from the ring. In addition, the MAC block preferably includes a timer 38 for use in latency measurements, as described below.

When MAC block 32 captures a packet that identifies its own node address as the source or destination address, it delivers the packet to a traffic processor 34 of the node. Processor 34 deals with network-layer functions, such as IP processing, and optionally other higher-level functions, such as Quality of Service (QoS) and network security. In a node that serves as an access point, for example, processor 34 is typically responsible for delivery of packets to users who are connected to network 20 through the node and for receiving packets from the users for transmission over network 20. A host processor 36 is connected to the traffic processor and performs higher-level processing functions, including computation of network latency.

The basic ring protocol in network 20 is extended by a latency measurement protocol, in accordance with a preferred embodiment of the present invention. The protocol defines a latency measurement packet (LMP), containing fields as shown generally in Table I below. Some of the fields are optional, and their order is given in the table by way of example only. Additional header and trailer bytes may be added as required by the lower layer protocols used in network 20.

TABLE I

LMP FORMAT

Destination address (DA)
Source address (SA)
Class of service (CoS)
Type
Loopback (LE)
Serial number (SN)
Generating node transmission time (Txtg)
Generating node receive time (Rxtg)
Peer node transmission time (Txtp)
Peer node receive time (Rxtp)

The fields in the LMP have the following special meanings and features:

Destination and source addresses—identify the originating and receiving nodes for the packet. For full-circuit latency measurements, these addresses are the same.

Type—indicates whether the LMP is for full-circuit or round-trip (peer) latency measurement.

Loopback—for round-trip latency measurements, set by the originating node to indicate that the packet is on its outbound leg (from the originating node to the peer), and reset by the peer node before transmitting the packet back on its inbound leg (from the peer to the originating node).

Serial number—incremented for each successive LMP to a specific DA.

Class of service—causes nodes 22 to handle the LMP with the same level of priority as ordinary communication traffic at this CoS level.

Txtg—N-bit value of timer 38 at the originating (generating) node at the time it transmitted the LMP.

Rxtg—N-bit value of timer 38 at the originating (generating) node at the time it received the LMP in return.

Txtp—N-bit value of timer 38 at the peer node at the time it transmitted the LMP back to the originating node (relevant only for node-to-node round-trip latency measurement).

Rxtp—N-bit value of timer 38 at the peer node at the time it received the LMP from the originating node (relevant only for node-to-node round-trip latency measurement).

In order to monitor latency in network 20, traffic processor 34 of an originating node (N2 in the example shown in FIG. 1) prepares a new LMP for sending periodically, either at preset intervals or in response to specific management commands. The traffic processor fills in the values of all the fields when it prepares the packet, with the exception of Txtg, Rxtg, Txtp and Rxtp. MAC block 32 recognizes the LMP by reading its type and inserts the value of Txtg indicated by timer 38. It adds lower-layer headers and footers and sends the LMP out on ring 24 or 26, as appropriate. Txtp and Rxtp are subsequently recorded by the peer node, and Rxtg is then recorded by the originating node when it receives the LMP in return.

For the purpose of recording Txtg, Rxtg, Txtp and Rxtp, timers 38 of the respective nodes preferably comprise N-bit timers whose clocks are driven at a frequency determined according to the desired measurement accuracy. Inexpensive, off-shelf oscillators with accuracy of ±100 ppm can be used conveniently for this purpose, and enable latency measurements to be made in the sub-millisecond range. When the timer reaches its limit, it rolls over to zero. The rollover period should therefore be greater than the expected maximum latency of the network, in order to avoid the possibility that the timer will roll over twice in the course of a measurement. Preferably, the timers of all the nodes have the same rollover period. There is no need for synchronization of the timer values, but it is desirable for round-trip latency measurements that the timer frequencies of the originating and peer nodes be approximately equal.

Figure 3:
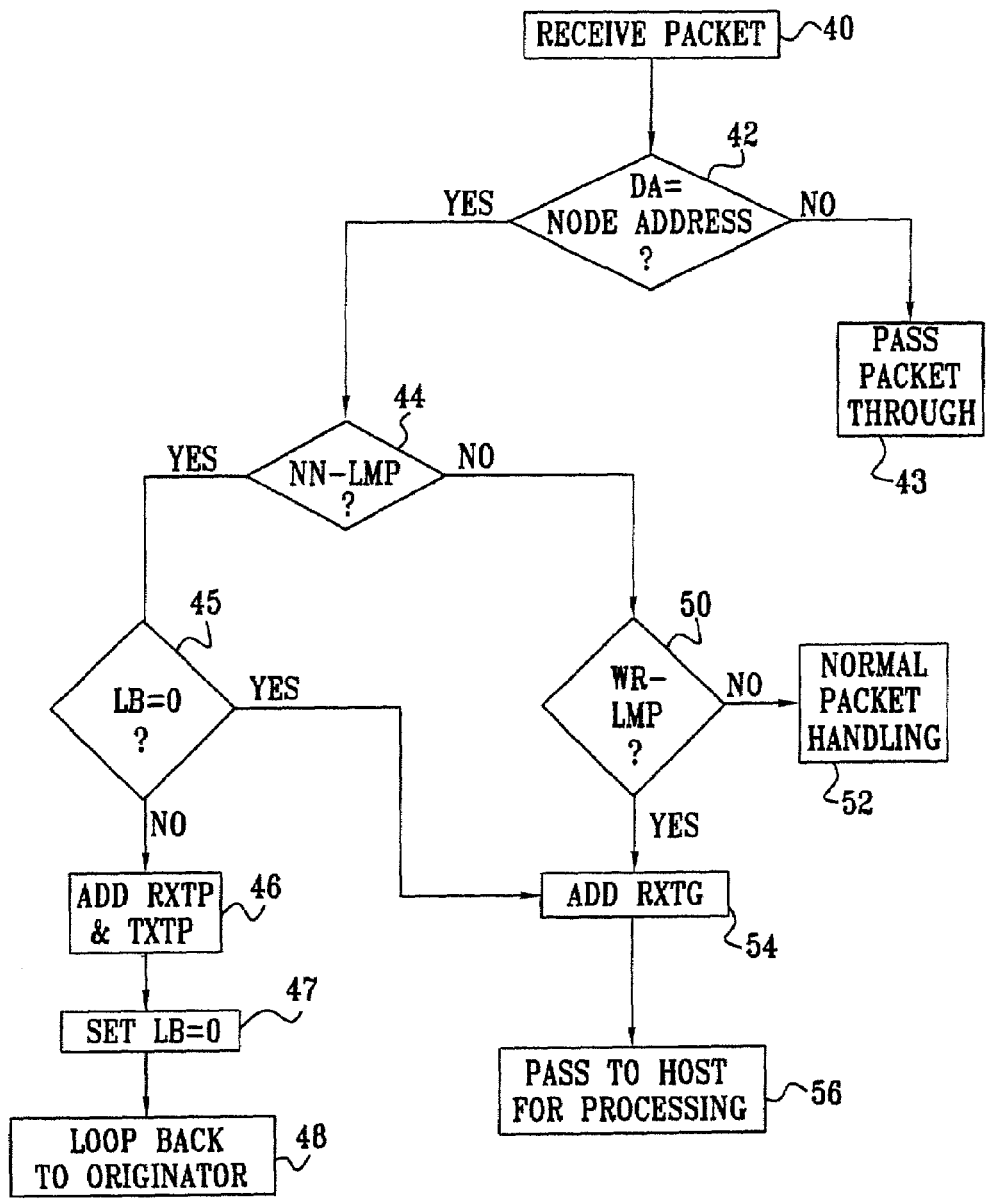
FIG. 3 is a flow chart that schematically illustrates processing of a latency measurement packet by a network node, in accordance with a preferred embodiment of the present invention.

FIG. 3 is a flow chart that schematically illustrates a method for processing of LMPs by nodes 22 in network 20, in accordance with a preferred embodiment of the present invention. The method is initiated whenever MAC block 32 of one of the nodes receives a packet on either ring 24 or ring 26, at a packet reception step 40. The MAC block first checks the DA field, at a destination checking step 42. If the destination MAC address is not the address of the node receiving the packet, MAC block 32 simply passes the packet through transparently, at a passthrough step 43, in the normal manner of packet-stripping ring networks.

If the destination address is the address of the node receiving the packet, the MAC block checks the packet to determine whether it is a LMP of the round-trip measurement type (i.e., a node-to-node, or NN, packet), at a peer checking step 44. If so, the MAC block next checks whether the loopback (LB) bit is set to one or zero, at a loopback checking step 45. If LB=1, the node receiving the packet is the peer node for this round-trip latency measurement. Accordingly, MAC block 32 of the peer node inserts in the LMP the value of Rxtp indicated by its timer 38, at a peer processing step 46. The peer node prepares to send the LMP back to the originating node indicated by the SA field by setting LB=0, at a loopback setting step 47. It then reverses the DA and SA values in the packet header, setting the SA to its own address and the DA to the address of the originating node, and thus loops the packet back to the originating node, at a loop-back step 48. Upon transmission of the LMP, the MAC block of the peer node inserts the value of Txtp indicated by its timer.

If at step 45, MAC block 32 determines that LB=0, it means that this round-trip measurement packet has already been looped back from the peer node to the originating node. In this case, the MAC block of the receiving node adds to the packet the value of Rxtg indicated by timer 38, at a final receiving step 54. The packet is then passed by traffic processor 34 to host 36 for computation of the latency, at a host processing step 56.

If the MAC block of the receiving node determines at step 44 that the packet is not a round-trip LMP, it then checks to determine whether this is a full-circuit LMP (i.e., a whole-ring, or WR, packet), at a full-circuit checking step 50. If not, then this is not a LMP at all, and MAC block 32 passes the packet to traffic processor 34 for normal processing, at a normal handling step 52. (Typically, such a packet would normally be dropped.) If this is a WR-LMP, the receiving node must also be the originating node of the LMP. In response, MAC block 32 of the receiving node adds to the packet the value of Rxtg, at step 54, and passes the packet to host 36 for computation of the latency, at step 56, as described above.

The processing applied by host 36 at step 56 depends on whether the LMP is a full-circuit (WR) type or round-trip (NN) type. WR-LMPs are passed around ring 24 or 26 transparently by all of the other nodes, and are then stripped from the ring by the originating node. They consequently contain null values of Txtp and Rxtp. Host 36 preferably keeps a record of the WR-LMPs it has sent and received using the SN field, and any WR-LMPs received out of order are discarded. In addition, an upper latency limit is preferably set by management command, and any WR-LMPs that take longer than this limit to return to the originating node are discarded, as well. These measures tend to reduce the occurrence of artifacts in the latency monitoring process.

When a WR-LMP has returned to the originating node in the proper order and within the time limit, host 36 calculates the full-circuit latency of the ring by subtracting Txtg from Rxtg, while taking into account possible rollover of timer 38. In other words, as long as Rxtg>Txtg, the latency is equal to Rxtg−Txtg. If Txtg>Rxtg, then the latency is given by Rxtg+($2^N$−Txtg), wherein $2^N$ is the maximum timer value of N-bit timer 38. Over a given period of M minutes, host 36 preferably stores the maximum and minimum latency values that it has measured. In addition, statistical processing may be applied to determine features such as the mean and variance of the latency.

In dealing with NN-LMPs, host 36 similarly discards packets that have arrived out of order or outside a maximum time limit. The time limit for round-trip latency measurements may be different from that set for full-circuit measurements, and it may also vary depending on the relative distance between the originating and peer nodes. For NN-LMPs that arrive in order and within the specified time limit, host 36 calculates the latency using the algorithm shown below in Table II, taking into account possible rollover of timer 38 in both the originating node and the peer node.

TABLE II—Round-Trip Latency Calculation

IF *Rxtg>Txtg* THEN *Temp*1=*Rxtg−Txtg*

ELSE *Temp*1=*Rxtg*+($2^N$−*Txtg*)

IF *Rxtp>Txtp* THEN *Temp*2=*Rxtp−Txtp*

ELSE *Temp*2=*Rxtp* +($2^N$−*Txtp*)

*NN* latency=*Temp*1−*Temp*2

Note that Temp1 is always larger than Temp2, since the period covered by Temp2 (i.e., the packet turnaround time at the peer node) is included in the period of Temp1. Preferably, host 36 stores minimum and maximum round-trip latency values and, optionally, analyzes the values, as described above.

Although preferred embodiments are described herein with specific reference to ring network 20 and to certain ring network protocols, aspects of the present invention are not limited to ring networks and may be applied in networks of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for measuring latency in a ring network in which traffic flows in first and second, mutually-opposite directions, the method comprising:

transmitting a latency measurement packet from an originating node to a peer node in the first direction in the network;

noting a time of receipt of the packet at the peer node;

transmitting the packet from the peer node back to the originating node in the second direction, while recording in the packet an indication of a peer node difference between a time of transmission of the packet from the peer node to the originating node and the time of receipt of the packet at the peer node;

noting a time of return of the packet to the originating node, so as to determine an originating node difference between a time of transmission of the packet from the originating node to the peer node and the time of return of the packet to the originating node; and calculating the latency by taking a difference between the originating node difference and the peer node difference, wherein transmitting the latency measurement packet comprises recording in the packet an indicaton of a class of service on the network, and transmitting the packet at a level of service accorded to the class, and wherein calculating the latency comprises determining the latency specific to the class of service.

2. A method according to claim 1, wherein recording the indication of the peer node difference comprises recording in the packet the time of transmission of the packet from the peer node to the originating node and the time of receipt of the packet at the peer node, both measured with respect to a peer clock maintained at the peer node.

3. A method according to claim 2, and comprising recording in the packet the time of transmission of the packet from the originating node to the peer node measured with respect to an originating clock maintained at the originating node, and wherein noting the time of return of the packet comprises recording the time of return with respect to the originating clock.

4. A method according to claim 1, wherein transmitting the latency measurement packet comprises transmitting a plurality of latency measurement packets in sequence at given intervals, and wherein calculating the latency comprises calculating respective latencies of the packets returned to the originating node, so as to monitor a variation in the latencies.

5. A method according to claim 4, wherein transmitting the plurality of the latency measurement packets comprises recording respective serial numbers in the packets in the sequence, and wherein calculating the respective latencies comprises disregarding the latencies of the packets returned to the originating node out of the sequence, as indicated by the serial numbers.

6. A method for measuring latency in a network in which traffic is transmitted in a plurality of classes of service, the method comprising:
generating a latency measurement packet containing an indication that the packet belongs to a selected one of the classes of service;
transmitting the latency measurement packet from a source node in the network, so that the packet is passed through the network at a level of service accorded to the class;
noting a time of receipt of the latency measurement packet at a destination node in the network; and
calculating the latency for the selected one of the classes of service by taking a difference between a time of transmission of the latency measurement packet and the time of receipt thereof.

7. A method according to claim 6, wherein generating the latency measurement packet comprises generating a plurality of latency measurement packets, containing respective indications that the packets belong respectively to the plurality of the classes of services, and wherein calculating the latency comprises determining the latency for each of the classes of service respectively.

8. A method according to claim 6, wherein the network comprises a ring network, and wherein transmitting the latency measurement packet comprises transmitting the packet around the ring network so that the destination node of the latency measurement packet is the source node, and wherein calculating the latency comprises determining the latency for the selected one of the classes of service for a full circuit of the ring network.

9. A method for measuring latency in a network, comprising:
transmitting a sequence of latency measurement packets at given intervals from a source node in the network, while recording in the packets respective times of transmission thereof;
noting respective times of receipt of the packets at a destination node in the network;
determining respective latencies for the packets in the sequence by calculating differences between the respective times of transmission recorded in the packets and the respective times of receipt; and
monitoring a variation in the latencies over the sequence based on the calculated differences,
wherein transmitting the sequence of the latency measurement packets comprises recording respective serial munbers in the packets in the sequence, and wherein monitoring the variation in the latencies comprises disregarding the respective latencies of any of the pakcets that are received out of the sequence, as indicated by the serial numbers.

10. A method according to claim 9, wherein the network comprises a ring network, and wherein transmitting the sequence of the latency measurement packets comprises transmitting the packets around the ring network so that the destination node of the latency measurement packets is the source node, and wherein determining the respective latencies comprises determining the latencies for a full circuit of the ring network.

11. Apparatus for measuring latency in a ring network in which traffic flows in first and second, mutually-opposite directions, the apparatus comprising first and second nodes in the network, the nodes comprising respective first and second clocks,
wherein the first node transmits a latency measurement packet to the second node in the first direction in the network, and
wherein the second node notes a time of receipt of the packet at the second node using the second clock, and to transmit the packet back to the first node in the second direction, while recording in the packet an indication, determined using the second clock, of a second node difference between a time of transmission of the packet from the second node to the first node and the time of receipt of the packet at the second node, and
wherein the first node further notes a time of return of the packet to the first node, using the first clock, so as to determine a first node difference between a time of transmission of the packet from the first node to the second node and the time of return of the packet to the first node, and to calculate the latency by taking a difference between the first node difference and the second node difference,
wherein the first node records in the packet an indication of a class of service on the network, and to transmit the packet at a level of service accorded to the class, so that the latency that it calculates is specific to the class of service.

12. Apparatus according to claim 11, wherein the indication of the second node difference recorded in the packet by the second node comprises a record of the time of transmission of the packet from the second node to the first node and the time of receipt of the packet at the second node, both measured using the second clock.

13. Apparatus according to claim 12, wherein the first node records in the packet the time of transmission of the packet from the first node to the second node, measured using the first clock.

14. Apparatus according to claim 11, wherein the first node transmits a plurality of latency measurement packets in sequence at given intervals, and to calculate respective latencies of the packets returned to the first node so as to monitor a variation in the latencies.

15. Apparatus according to claim 14, wherein the first node records respective serial numbers in the packets in the sequence, and to disregard the latencies of the packets returned to the first node out of the sequence, as indicated by the serial numbers.

16. Apparatus for measuring latency in a network in which traffic is transmitted in a plurality of classes of service, the apparatus comprising a node in the network, which generates a latency measurement packet containing an indication that the packet belongs to a selected one of the classes of service and to transmit the latency measurement packet, so that the packet is passed through the network at a level of service accorded to the class, the node notes a time of receipt of the latency measurement packet at a destination in the network and to calculate the latency for the selected one of the classes of service by taking a difference between a time of transmission of the latency measurement packet and the time of receipt thereof.

17. Apparatus according to claim 16, wherein the node generates a plurality of latency measurement packets, containing respective indications that the packets belong respectively to the plurality of the classes of services, and to determine the respective latency for each of the classes of service based on the plurality of the packets.

18. Apparatus according to claim 16, wherein the network comprises a ring network, and wherein the node transmits the packet around the ring network so that the destination of the latency measurement packet is the node itself, so as to measure the latency for the selected one of the classes of service for a full circuit of the ring network.

19. Apparatus for measuring latency in a network, comprising a node in the network, which transmits a sequence of latency measurement packets through the network at given intervals while recording in the packets respective times of transmission thereof, to note respective times of receipt of the packets at a destination in the network, and to determine respective latencies for the packets in the sequence by calculating differences between the respective times of transmission recorded in the packets and the respective times of receipt, so as to monitor a variation in the latencies over the sequence based on the calculated differences, wherein the node records respective serial numbers in the packets in the sequence, and to disregard the respective latencies of any of the packets that are received out of the sequence, as indicated by the serial numbers.

20. Apparatus according to claim 19, wherein the network comprises a ring network, and wherein the node transmits the packets around the ring network so that the destination of the latency measurement packets is the node itself, and wherein the respective latencies determined by the node are the latencies for a full circuit of the ring network.

* * * * *